(12) United States Patent
Jung

(10) Patent No.: US 7,450,968 B2
(45) Date of Patent: Nov. 11, 2008

(54) MOBILE COMMUNICATION DEVICE WITH SLIDE PORTION

(75) Inventor: Sang-Hyuck Jung, Suwon-shi (KR)

(73) Assignee: Samsung Electronics Co., Ltd. (KR)

( * ) Notice: Subject to any disclaimer, the term of this patent is extended or adjusted under 35 U.S.C. 154(b) by 231 days.

(21) Appl. No.: 10/725,785

(22) Filed: Dec. 2, 2003

(65) Prior Publication Data

US 2004/0142719 A1 Jul. 22, 2004

(30) Foreign Application Priority Data

Jan. 22, 2003 (KR) .................. 10-2003-0004309

(51) Int. Cl.
*H04M 1/00* (2006.01)
*H04B 1/38* (2006.01)

(52) U.S. Cl. .................. 455/566; 455/575.1; 455/90.3; 455/66.1

(58) Field of Classification Search ............. 455/575.4, 455/466, 575.8, 575.1, 566, 757.4, 550, 90.1–90.3, 455/403, 557, 73; 379/433.11, 433.12, 433.01, 379/428, 419–441

See application file for complete search history.

(56) References Cited

U.S. PATENT DOCUMENTS

| | | | | |
|---|---|---|---|---|
| 5,369,788 A * | 11/1994 | Nagai | ...................... | 455/575.4 |
| 5,450,619 A * | 9/1995 | Maeda | ....................... | 455/566 |
| 5,461,672 A * | 10/1995 | Enokido et al. | ........ | 379/433.02 |
| 5,960,332 A * | 9/1999 | Michalzik | ................. | 455/575.1 |
| 6,009,338 A * | 12/1999 | Iwata et al. | ............... | 455/575.4 |
| 6,208,874 B1 * | 3/2001 | Rudisill et al. | ............ | 455/575.4 |
| 6,272,324 B1 * | 8/2001 | Rudisill et al. | ........... | 455/575.8 |
| 6,370,362 B1 * | 4/2002 | Hansen et al. | ............. | 455/90.1 |
| 6,463,262 B1 * | 10/2002 | Johnson et al. | ............ | 455/90.1 |
| 6,785,565 B2 * | 8/2004 | Gventer | ................... | 455/575.4 |
| 2003/0171133 A1 * | 9/2003 | Mizuta et al. | ................ | 455/550 |

* cited by examiner

*Primary Examiner*—Charles N Appiah
*Assistant Examiner*—Emem Stephen
(74) *Attorney, Agent, or Firm*—The Farrell Law Firm, PC

(57) ABSTRACT

Disclosed is a mobile communication device comprising a slide cover being longitudinally slid towards or away from a main body of the mobile communication device according to use of the mobile communication device. The mobile communication device includes the main body having a liquid crystal display and guide holes formed at both sides of the liquid crystal display; a slide cover including a speaker, and being provided on a front surface of the liquid crystal display so as to be slid along a longitudinal direction of the main body, thus exposing the entire or a portion of the liquid crystal display; a pop-up module being connected to the slide cover, and being inserted into the guide holes so that the slide cover is slid along the front surface of the liquid crystal display of the main body; and a side grip provided at a side surface of the main body so as to fix or release a position of the pop-up module.

14 Claims, 11 Drawing Sheets

MOBILE COMMUNICATION DEVICE WITH SLIDE PORTION

PRIORITY

This application claims priority to an application entitled "MOBILE COMMUNICATION DEVICE", filed in the Korean Industrial Property Office on Jan. 22, 2003 and assigned Serial No. 2003-04309, the contents of which are hereby incorporated by reference.

BACKGROUND OF THE INVENTION

1. Field of the Invention

The present invention relates to a mobile communication device, and more particularly to a mobile communication device comprising a slide cover for sliding towards or away from a main body of the mobile communication device according to use of the mobile communication device so as to expose the entire or a portion of a liquid crystal display.

2. Description of the Related Art

Conventionally, mobile communication devices refer to portable units for communicating with a counterpart via wireless communication. Such mobile communication devices include an HHP (Hand Held Phone), a CT-2 cellular phone, a digital phone, a PCS phone, a PDA (Personal Digital Assistant), etc. The mobile communication devices are divided into several types according to their external shape. For example, the mobile terminals may be divided into bar-type terminals, flip-type terminals, and folder-type terminals, according to their external shapes. The bar-type mobile terminal comprises a bar-type housing. The flip-type mobile terminal comprises a bar-type housing and a flip or a cover rotatably connected to the housing by a hinge unit. The folder-type mobile terminal comprises a bar-type housing, and a folder rotatably connected to the housing by a hinge unit, thereby being folded or unfolded.

Further, the mobile terminals may be divided into neck wearable-type terminals, wrist wearable-type terminals, etc., according to their wearing locations. The neck wearable-type terminal is hung on a user's neck using a string, and the wrist wearable-type terminal is held on a user's wrist. Moreover, the mobile terminals may be divided into rotation-type terminals and sliding-type terminals according to the manner of opening or closing. The rotation-type terminal is opened and closed by a relative rotational motion of its two housings facing each other and rotatably connected to each other. The sliding-type terminal is opened and closed by a longitudinal sliding motion of one housing of its two housings.

Those skilled in the art will appreciate the designs of the aforementioned various mobile terminals. Each of the above conventional mobile terminals essentially comprises an antenna unit, data input and output units, and data. transmission and reception units. Of course, a keypad, through which data is inputted into the terminal by pressing with the fingers, is mainly used as the data input unit. Otherwise, a touch pad or a touch screen may be used as the data input unit. A LCD (liquid crystal display) is mainly used as the data output unit so as to display data. The keypad includes an array of a plurality of keys. Herein, the keys include a send (SND) key serving as a communication start button, a delete key, a clear (CLR) key, numeral keys, character keys, an end (END) key, function (FCN) keys, a power-supply (PWR) key serving to perform switching on/off of power supply, etc. The keys are arranged at proper positions on an upper surface of a housing of the mobile terminal, in a total number of approximately 15 to 20. Since the keys are exposed from the upper surface of the housing, desired data are inputted into the terminal by a user's pressing action.

In the case of the bar-type and flip-type mobile terminals, a bar-type single housing is prepared. Then, a liquid crystal display, a keypad, a microphone, and a speaker are provided on a front surface of the housing, and an antenna unit is provided on a rear surface of the housing. Particularly, in the flip-type mobile terminal, the liquid crystal display is exposed on the front surface of the housing so that transmitted and received data are displayed thereon, and the keypad including a plurality of keys for inputting data is installed below the liquid crystal display. The microphone for transmitting a user's voice to a counterpart is installed below the keypad. Further, a flip is rotatably connected to a lower end of the housing of the terminal by a hinge unit so as to protect the keypad and concentrate the user's voice toward the microphone.

However, since the liquid crystal display of the conventional mobile terminal has a narrow screen, it has a limitation in that it is unable to display a long message on the screen of the liquid crystal display. Further, since it is difficult to display a long document downloaded via the Internet on the screen of the liquid crystal display, the liquid crystal display of the conventional mobile terminal cannot perform various display functions. Moreover, since the liquid crystal displays of the conventional bar-type and flip-type mobile terminals are exposed to the outside, even when light external impact is applied to the liquid crystal displays, the surfaces of the liquid crystal displays are damaged and the liquid crystal displays must be replaced with new ones.

SUMMARY OF THE INVENTION

Therefore, the present invention has been made in view of the above problems, and it is an object of the present invention to provide a mobile communication device comprising a slide cover longitudinally sliding towards or away from a main body of the mobile communication device according to use of the mobile communication device so as to expose the entire or a portion of a liquid crystal display, thereby widening the range of a screen of the liquid crystal display and improving its display functions. It is a further object of the present invention to provide a mobile communication device comprising a slide cover longitudinally sliding towards or away from the main body according to use of the mobile communication device so as to expose the entire or a portion of a liquid crystal display, thereby protecting the liquid crystal display from external impacts.

It is another object of the present invention to provide a mobile communication device comprising a slide cover longitudinally sliding towards or away from the main body, in which a liquid crystal display serves as a main liquid crystal display when the slide cover is completely opened to expose the entire of the liquid crystal display, and serves as a sub-liquid crystal display when the slide cover is partially opened to expose a portion of the liquid crystal display.

It is yet another object of the present invention to provide a mobile communication device comprising a slide cover longitudinally sliding towards or away from the main body of the mobile communication device, in which the slide cover is opened from and closed into the main body by a one-touch manner, thereby allowing the slide cover to be easily opened from and closed into the main body.

In accordance with the present invention, the above and other objects can be accomplished by the provision of a mobile communication device comprising: a main body including a liquid crystal display and guide holes formed at both sides of the liquid crystal display; a slide cover including a speaker, and being provided on a front surface of the liquid crystal display so as to be slid towards or away from, a longitudinal direction, of the main body, thus exposing the entire or a portion of the liquid crystal display; a pop-up module being connected to the slide cover, and being inserted into the guide holes so that the slide cover is slid towards or away from the main body along the front surface of the liquid crystal display of the main body; and a side grip provided at a side surface of the main body so as to fix or release a position of the pop-up module.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
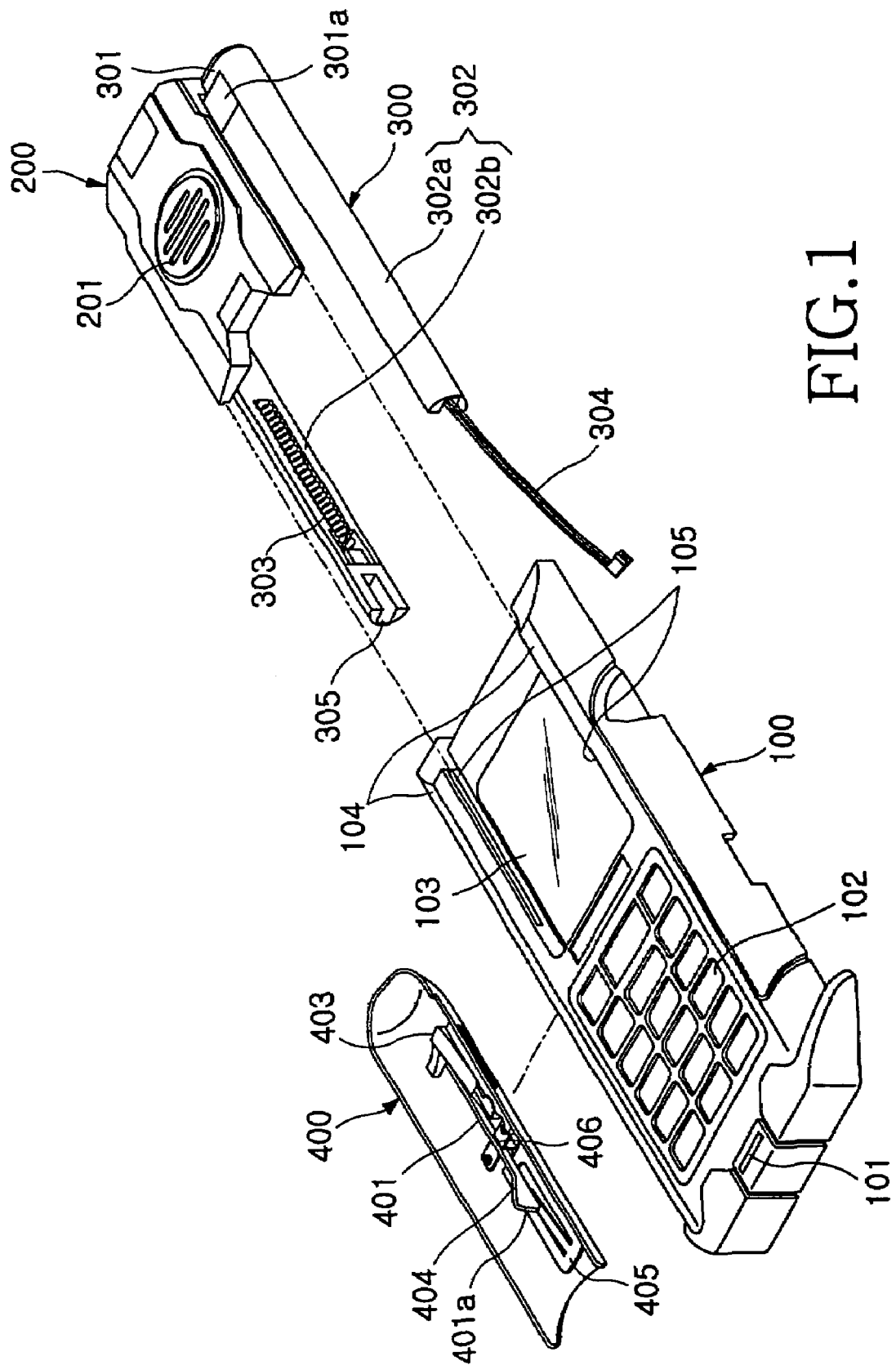
FIG. 1 is an exploded perspective view of a front surface of a mobile communication device in accordance with an embodiment of the present invention.

Now preferred embodiments of the present invention will be described in detail with reference to the annexed drawings. As shown in FIGS. 1 to 11, a mobile communication device comprises a main body 100, a slide cover 200, a pop-up module 300, and a side grip 400. The main body 100 includes a microphone 101, a key pad 102, a liquid crystal display 103 serving to display data to be transmitted and received, and guide holes 104. Herein, the guide holes 104 are formed at both side edges on the main body 100 so as to receive bars 302 of the pop-up module 300. The slide cover 200 includes a speaker 201.

The slide cover 200 is provided on a front surface of the liquid crystal display 103 of the main body 100 so as to be slid towards or away from main body 100, thereby exposing the entire or a portion of the liquid crystal display 103. The pop-up module 300 is connected to the slide cover 200, and the bars 302 of the pop-up module 300 are inserted into the guide holes 104 of the main body 100 so that the slide cover 200 is slid along the front surface of the liquid crystal display 103 of the main body 100.

The side grip 400 is provided at a side surface of the main body 100 so as to fix or release the position of the pop-up module 300. Guide grooves 105 are formed at both sides of the liquid crystal display 103 of the main body 100 in a longitudinal direction of the liquid crystal display 103 so as to guide both side surfaces of the slide cover 200.

The liquid crystal display 103 of the main body 100 serves as a main liquid crystal display 103b (FIG. 6) when the slide cover 200 is slid away from the main body 100 during use of the mobile communication device so as to be completely opened to expose the entire of the liquid crystal display 103. Further, the liquid crystal display 103 of the main body 100 serves as a sub-liquid crystal display 103a (FIG. 3) when the slide cover 200 is slid towards the main body 100 during nonuse of the mobile communication device so as to be partially opened to expose a portion of the liquid crystal display 103. The slide cover 200 is slid away from the main body 100 during use of the mobile communication device so as to be completely opened to expose the entire of the liquid crystal display 103, and slid towards the main body 100 during nonuse of the mobile communication device so as to be partially opened to expose a portion of the liquid crystal display 103.

The pop-up module 300 includes a head section 301, at least one bar (herein, two bars 302a and 302b), and a coiled compression spring 303. The head section 301 is connected and fixed to the slide cover 200. The bars 302a and 302b are formed at both ends of the head section 301 so as to be inserted into each of the guide holes 104, and simultaneously to be slid along each of the guide holes 104. The coiled compression spring 303 is installed within the bar 302b, and provides elastic force during sliding of the bar 302b. The pop-up module 300 is preferably made of metal, although other suitable materials may be used. The head section 301 includes a connection plate 301a for connecting the bars 302a and 302b to each other.

A flexible circuit 304 is installed within the bar 302a so as to be electrically connected to the speaker 201. The coiled compression spring 303 is installed within the bar 302b, and a locking groove 305 is formed in the lower end of the bar 302b so that a protrusion 401a of a locking plate 401 is locked into or unlocked from the locking groove 305.

The side grip 400 includes a locking plate 401, a one-touch button 402, and a locker unit 403. The locking plate 401 is installed within the side grip 400 so as to be locked into or unlocked from the locking groove 305 of the bar 302b. The one-touch button 402 is installed on the external surface of the side grip 400 so that the locking plate 401 is rotated in a clockwise or a counterclockwise direction by pressing the one-touch button 402 by external force, thus separating the locking plate 401 from the locking groove 305.

The locker unit 403 is installed at a designated position of the external surface of the side grip 400 adjacent to the one-touch button 402 so as to maintain the locked state of the locking plate 401 into the locking groove 305. Herein, an upper end of the locking plate 401 contacts the one-touch button 402 so that the locking plate 401 is operated simultaneously with the pressing of the one-touch button 402. Further, a lower end of the locking plate 401 is provided with the protrusion 401a locked into the locking groove 305.

An incline plane 404 is formed on the protrusion 401a so as to guide the locking groove 305 during sliding movement of the locking groove 305. A hinge unit 406 is installed in the central portion of the locking plate 401a so that the locking plate 401 is rotated in a clockwise or a counterclockwise direction by pressing the one-touch button 402.

A plate spring 405 is installed on the rear surface of the protrusion 401a of the locking plate 401, and provides elastic force to the protrusion 401a so that the locking plate 401 is rotated in a clockwise or a counterclockwise direction. The locker unit 403 includes a sliding button 403a and a locking section 403b. The sliding button 403a protrudes from an external surface of the side grip 400 so as to be slidingly movable by external force.

The locking section 403b is formed integrally with the sliding button 403a, and installed within the side grip 400 so as to move together with the sliding motion of the sliding button 403a, thereby fixing or releasing the locking plate 401.

A contacting protrusion 500 is installed at the upper end of the locking section 403b so as to contact and fix the locking plate 401 according to the sliding motion of the locking section 403b.

A stopper 600 (FIGS. 7, et seq.) is installed at a lower end of the locking section 403b so as to stop the sliding motion of the locking section 403b. The stopper 600 includes a stopping protrusion 601 and at least one recess 602. The stopping protrusion 601 is connected to the locking section 403b so as to be inserted into the recess 602, thereby fixing the locking section 403b. The recess 602 is installed in a designated location of an inner wall of the side grip 400 so as to accommodate the stopping protrusion 601.

Hereinafter, with reference to FIGS. 1 to 11, an operation of the mobile communication device in accordance with the preferred embodiment of the present invention is described in detail.

Figure 2:
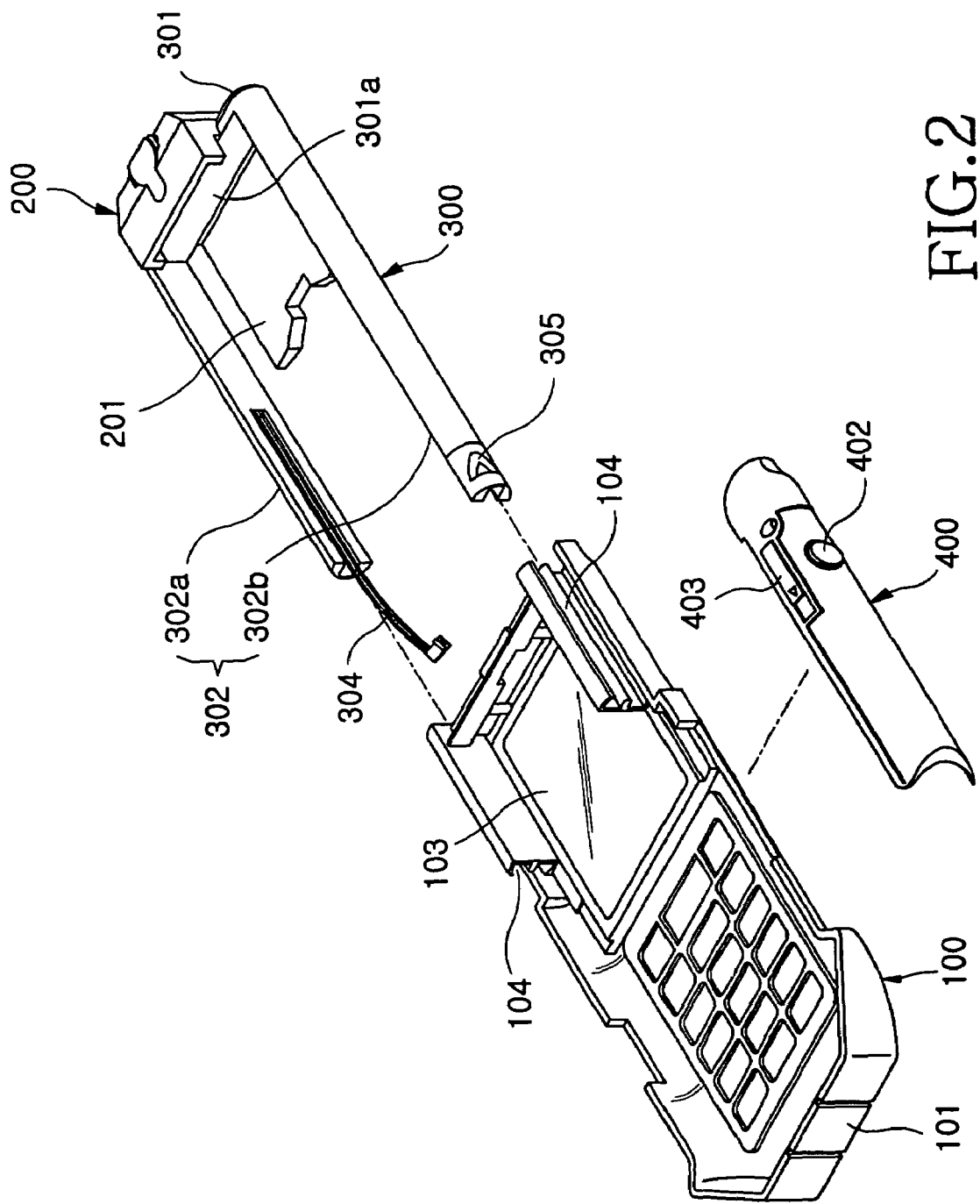
FIG. 2 is an exploded perspective view of a rear surface of the mobile communication device in accordance with the embodiment of the present invention.
Figure 3:
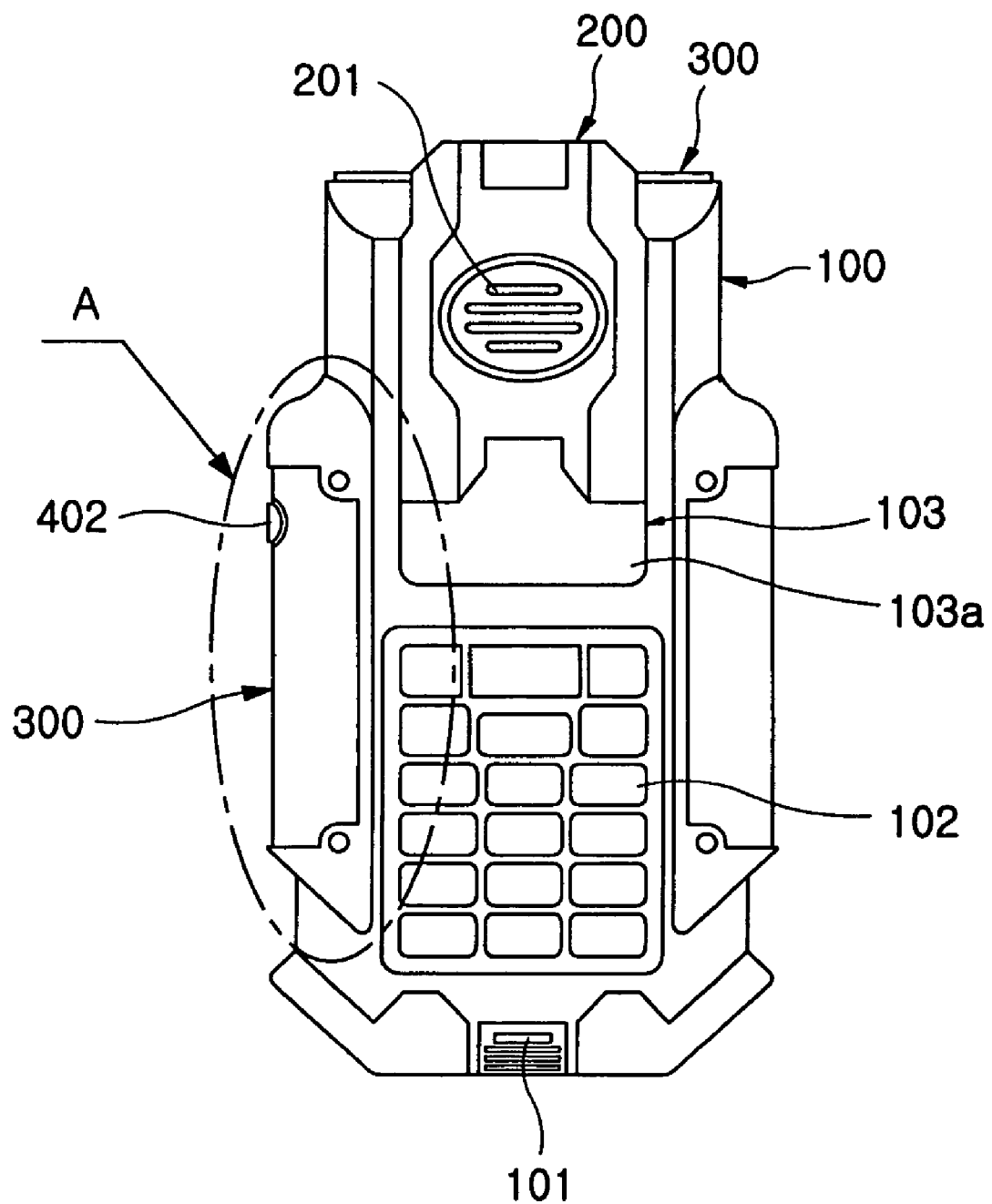
FIG. 3 is a front view of the mobile communication device prior to its use in accordance with the embodiment of the present invention.

As shown in FIGS. 1 and 2, the main body 100 of the mobile communication device is provided with the microphone 101, the keypad 102, and the liquid crystal display 103. Further, the slide cover 200 is provided on the front surface of the liquid crystal display 103. The slide cover 200 is slid towards or away from main body 100 according to use of the mobile communication device, thereby exposing the entire or a portion of the liquid crystal display 103. As shown in FIG. 3, there is provided the mobile communication device, in which the liquid crystal display 103 is partially exposed by the slide cover 200.

As described above, during nonuse of the mobile communication device of the present invention, the liquid crystal display 103 is partially exposed by the slide cover 200, thereby serving as the sub-liquid crystal display 103a.

Figure 4:
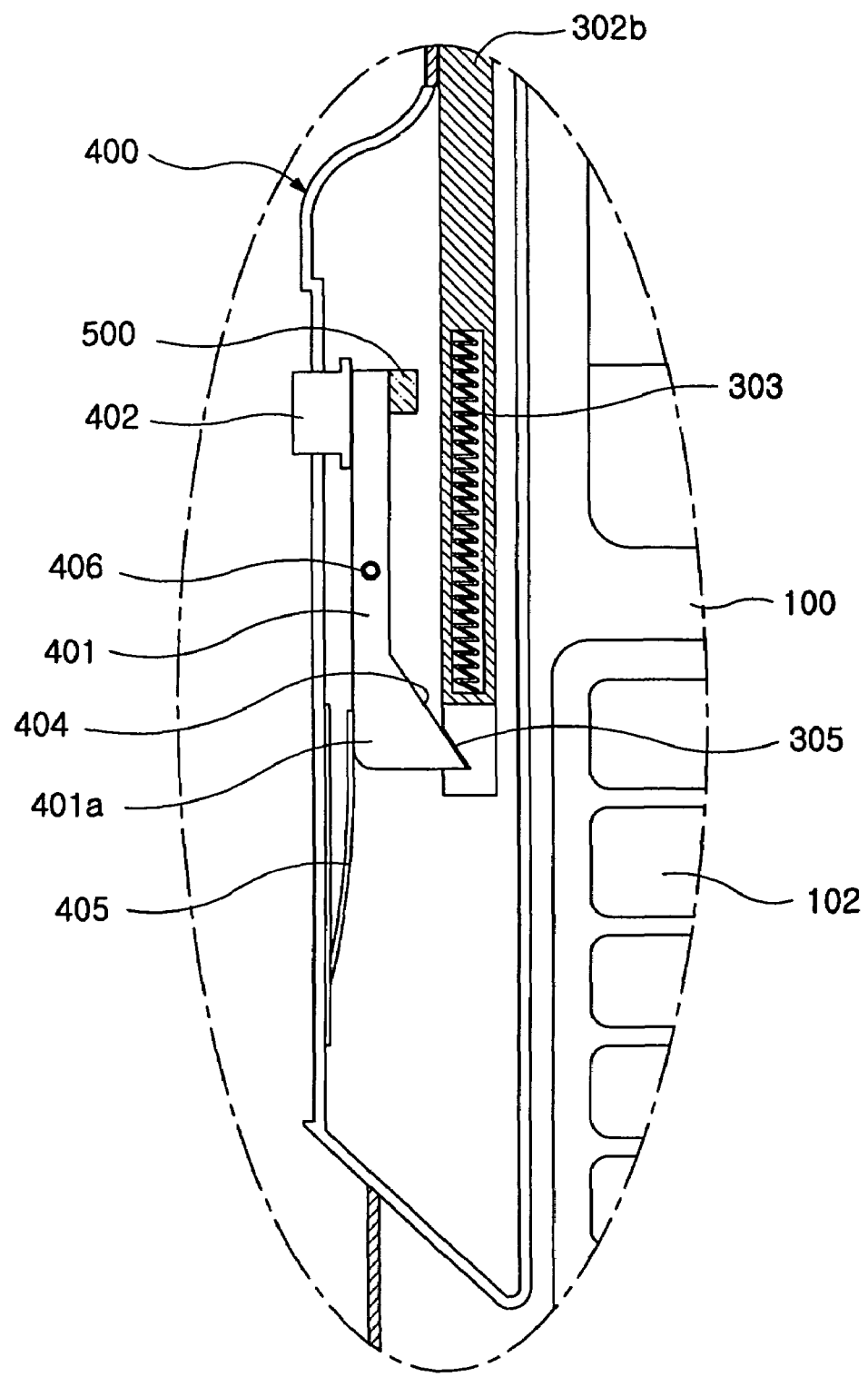
FIG. 4 is an enlarged view of a portion "A" of FIG. 3.
Figure 5:
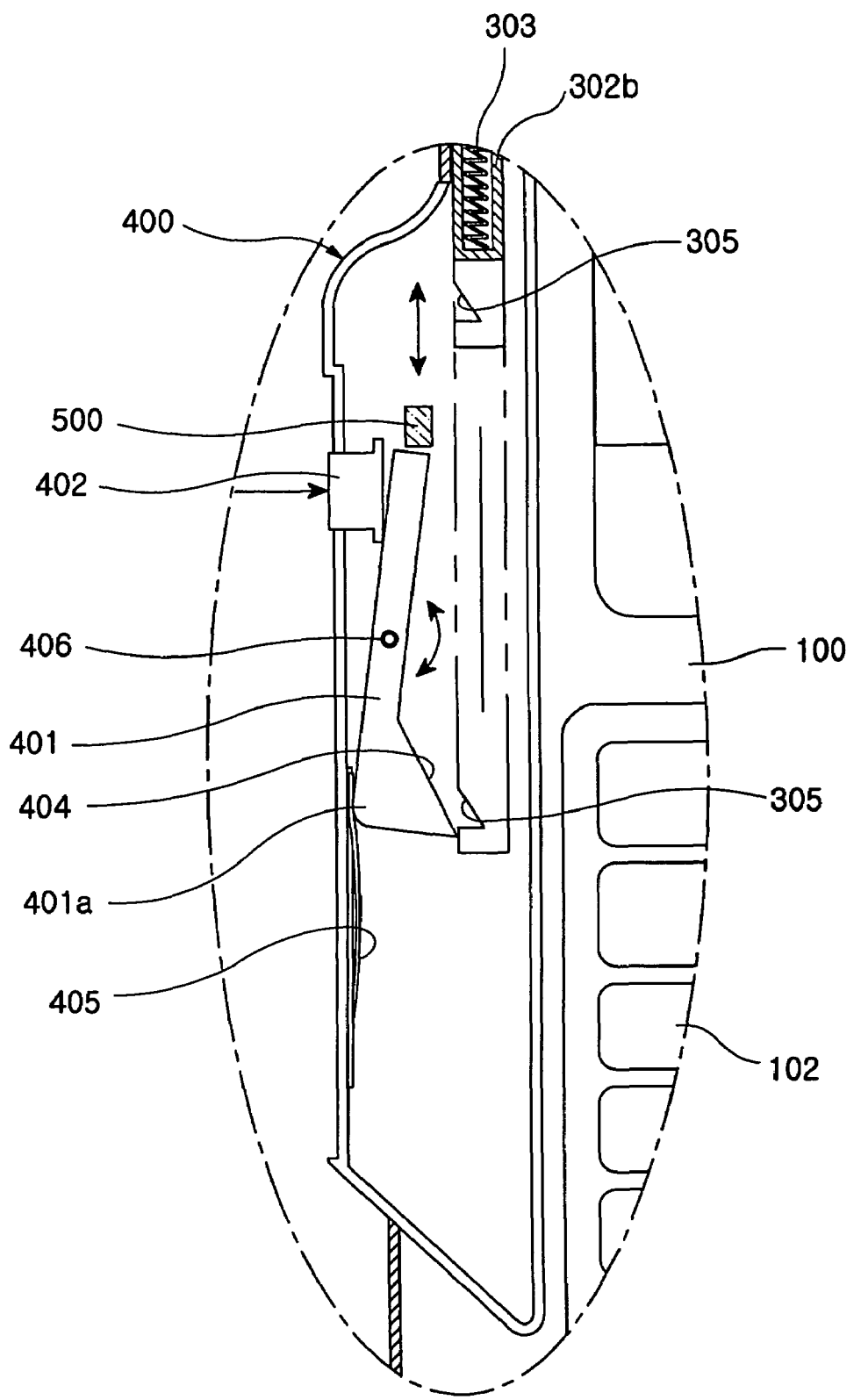
FIG. 5 is an enlarged view of the portion "A" of FIG. 3 during use of the mobile communication device.

As shown in FIGS. 4 and 5, there is provided the pop-up module 300, which is connected to the slide cover 200 and inserted into the guide holes 104 of the main body 100 so that the slide cover 200 is slid along the front surface of the liquid crystal display 103 of the main body 100 during a telephone call. Further, the side grip 400 is installed at a side surface of the main body 100 so as to fix the position of the pop-up module 300 or release the pop-up module 300. When the one-touch button 402 of the side grip 400 is pressed, the pop-up module 300 is released from the side grip 400, and then is slid away from the main body 100.

Simultaneously with the sliding motion of the pop-up module 300, the slide cover 200 is slid away from the main body 100.

Herein, since the pop-up module 300 includes the head section 301 connected to the slide cover 200, the head section 301 and the slide cover 200 are slid together.

The bars 302a and 302b are formed at both ends of the head section 301 so as to be inserted into each of the guide holes 104. The coiled compression spring 303 installed within the bar 302b, provides an elastic force. As the bar 302b is slid towards or away from the main body 100, the bars 302a and 302b are slid under the elastic force supplied from the coiled compression spring 303.

further, the flexible circuit 304 connected to the speaker 201 is installed within the bar 302a. The locking groove 305 is formed in the lower end of the bar 302b.

Since the locking plate 401 is installed within the side grip 400 so as to be locked into or unlocked from the locking groove 305 of the bar 302b, when the one-touch button 402 is pressed the locking plate 401 is separated from the locking groove 305 and the bars 302a and 302b are slid away from main body 100.

As shown in FIG. 5, the front surface of the one-touch button 402 protrudes from the external surface of the side grip 400, and the rear surface of the one-touch button 402 contacts the upper end of the locking plate 401. Therefore, when the one-touch button 402 is pressed, the rear surface of the one-touch button 402 pushes the upper end of the locking plate 401, thereby rotating the locking plate 401 centering on the hinge unit 406 so that the upper end of the locking plate 401 moves toward the main body 100.

Herein, the protrusion 401a of the lower end of the locking plate 401 is separated from the locking groove 305.

Further, the plate spring 405 is installed on the rear surface of the protrusion 401a of the locking plate 401, and provides elastic force so that the locking plate 401 is rotated centering on the hinge unit 406 in a clockwise or counterclockwise direction.

Figure 6:
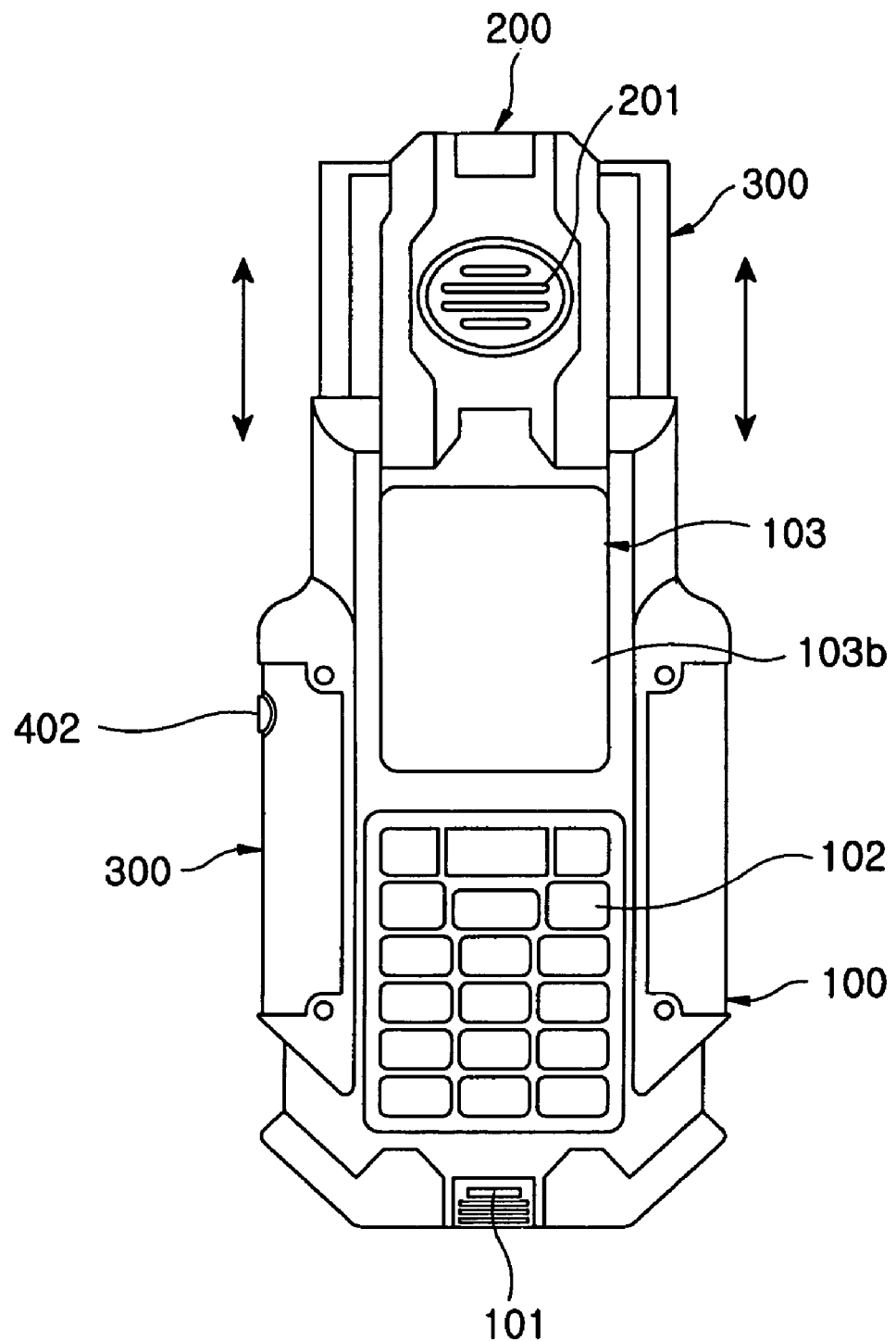
FIG. 6 is a front view of the mobile communication device after its use in accordance with the embodiment of the present invention.

As shown in FIG. 6, the guide grooves 105 (shown in FIG. 1) are formed at both sides of the liquid crystal display 103 of the main body 100 in a longitudinal direction of the liquid crystal display 103 so as to guide both side surfaces of the slide cover 200. Therefore, the slide cover 200 is guided by the guide grooves 105.

Herein, the slide cover 200 completely opens the front surface of the liquid crystal display 103. In this state, a user uses the mobile communication device of the present invention in order to communicate with a counterpart, and transmitted and received data are displayed on the liquid crystal display 103.

As shown in FIG. 3, when the user terminates the telephone call, the slide cover 200 is slid towards main body 100 by the user. Then, the locking groove 305 formed in the bar 302b is slid towards main body 100, and the protrusion 401a of the locking plate 401 within the side grip 400 is locked into the locking groove 305.

Figure 7:
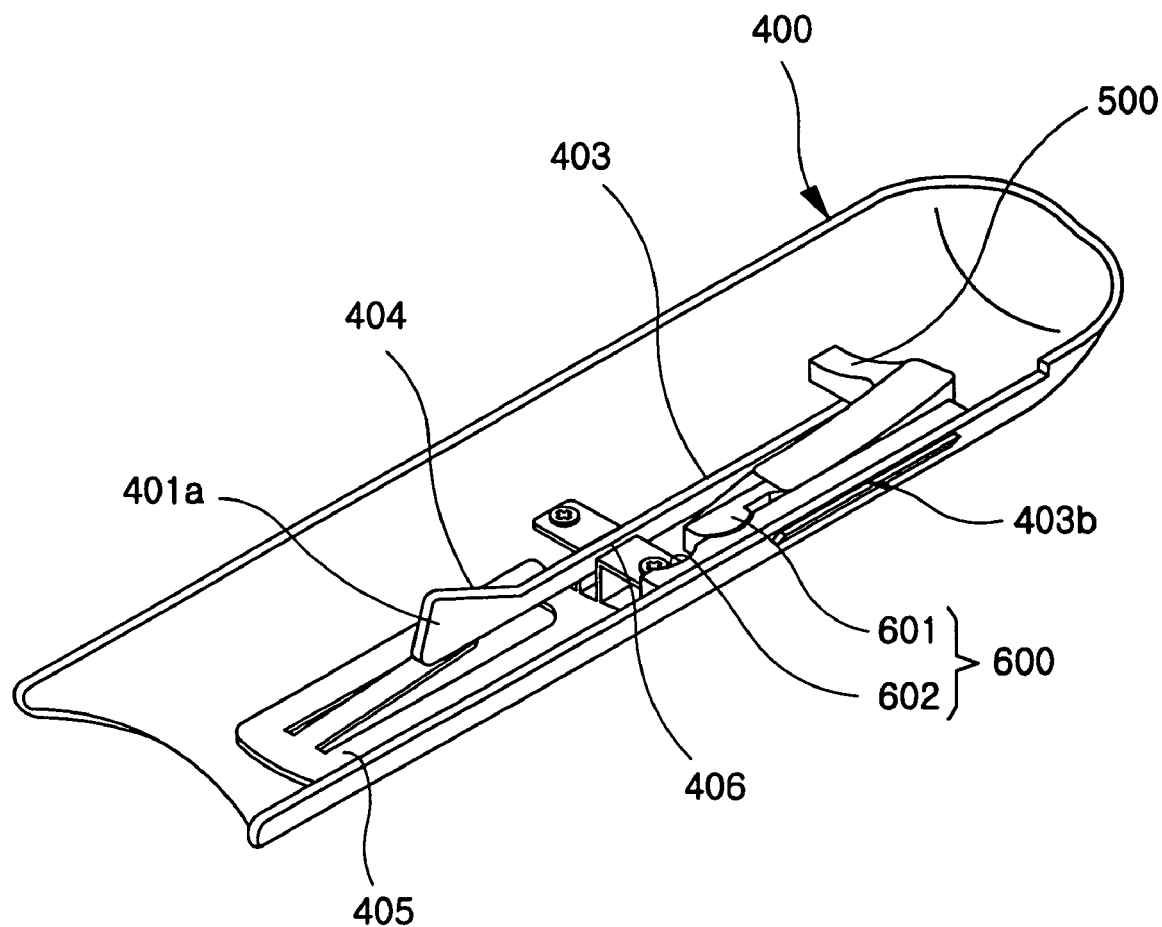
FIG. 7 is a perspective view of a side grip of the mobile communication device in accordance with the embodiment of the present invention.

As shown in FIGS. 5 and 7, since the incline plane 404 is formed on the protrusion 401a, the locking groove 305 is guided along the incline plane 404 and the protrusion 401a is inserted into the locking groove 305. Thereby, the bar 302b is fixed to the side grip 400 and simultaneously the slide cover 200 is fixed to the side grip 400.

Figure 8:
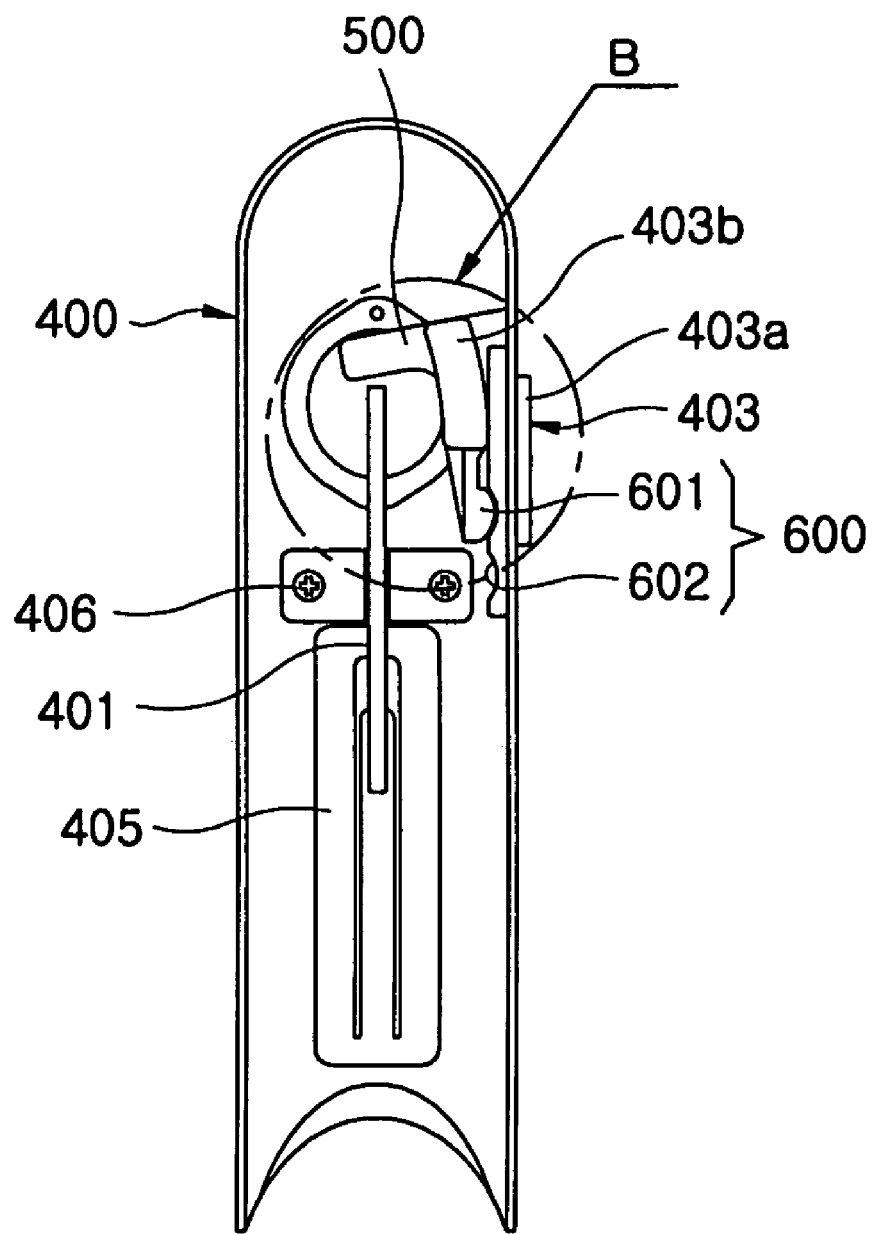
FIG. 8 is a front view of the inside of the side grip of the mobile communication device in accordance with the embodiment of the present invention.
Figure 9:
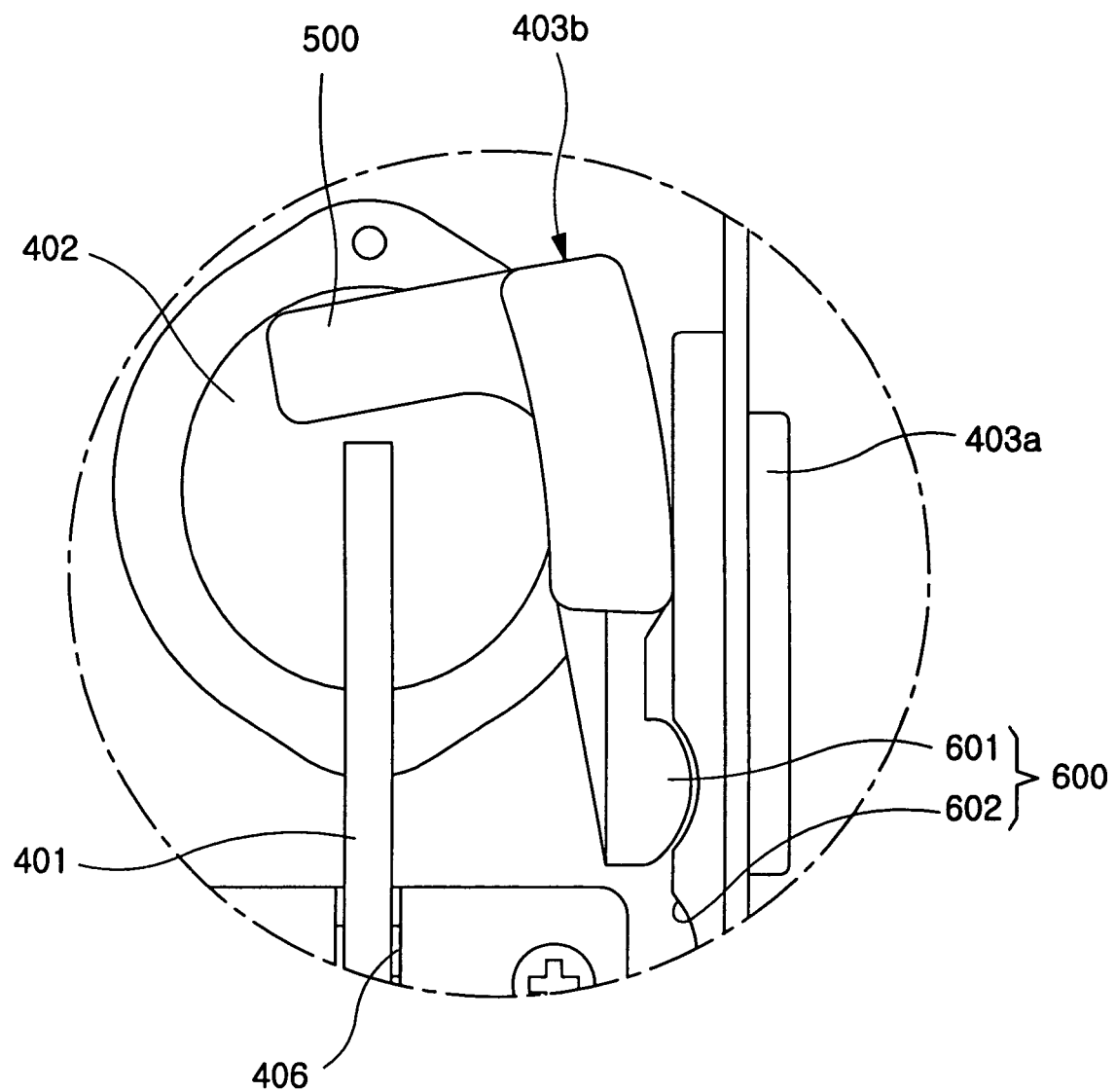
FIG. 9 is an enlarged view of a portion "B" of FIG. 8.

Herein, as shown in FIGS. 7 to 9, the locker unit 403 is installed at a designated position of the external surface of the side grip 400 adjacent to the one-touch button 402 so as to maintain the locked state of the protrusion 401a of the locking plate 401 into the locking groove 305. Therefore, the protrusion 401a of the locking plate 401 is locked into the locking groove 305, and its locked state is maintained by the locker unit 403.

Figure 10:
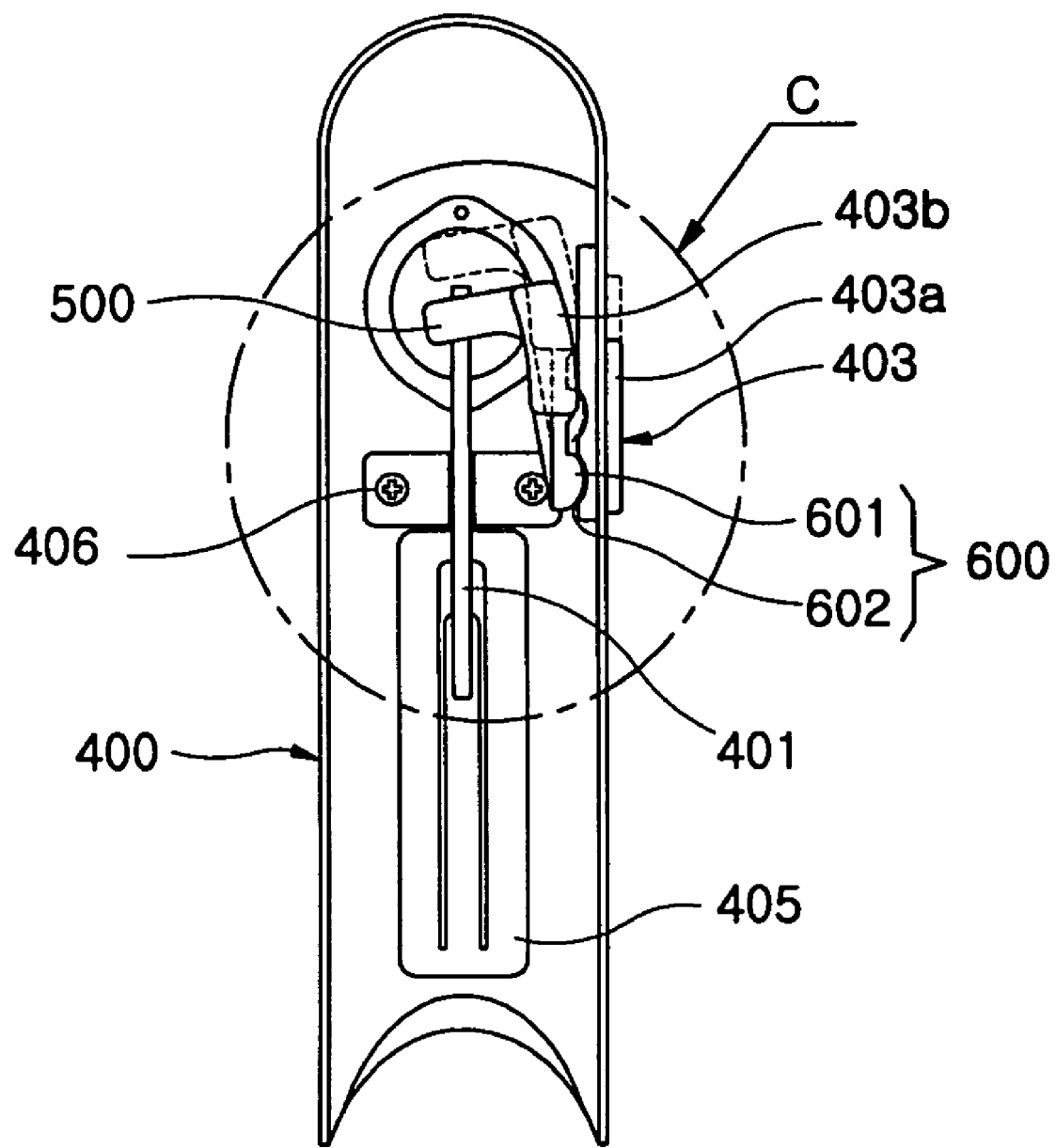
FIG. 10 is a front view of the inside of the side grip of the mobile communication device during use in accordance with the embodiment of the present invention.
Figure 11:
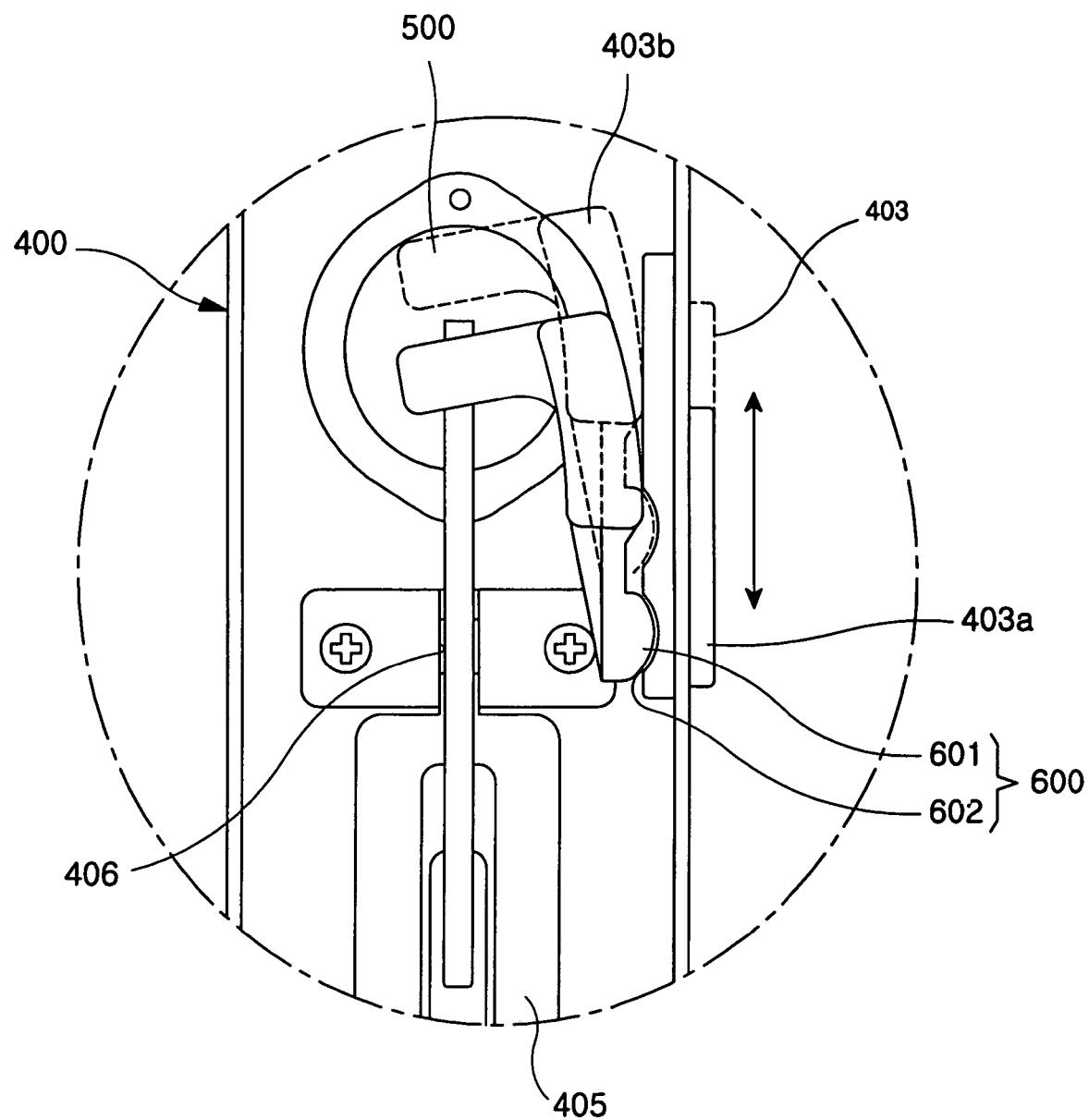
FIG. 11 is an enlarged view of a portion "C" of FIG. 10.

As shown in FIGS. 10 and 11, the sliding button 403a protrudes from the external surface of the side grip 400 so as to be slid by external force. Herein, the sliding button 403a is slid in the direction towards main body 100.

Further, the locking section 403b is formed integrally with the sliding button 403a and installed within the side grip 400 so as to move together with the sliding motion of the sliding button 403a, thereby fixing or releasing the locking plate 401. Therefore, when the sliding button 403a is slid in the direction towards main body 100, the locking section 403b also moves in that direction, thereby fixing the locking plate 401.

As shown in FIG. 11, the contacting protrusion 500 is installed at the upper end of the locking section 403b so as to contact and simultaneously fix the locking plate 401. Therefore, when the locking section 403b moves in the direction towards main body 100, the contacting protrusion 500 also moves in that direction and then contacts the locking plate 401, thereby fixing the locking plate 401.

Further, as shown in FIG. 11, the stopper 600 is installed at the lower end of the locking section 403b so as to stop the sliding motion of the locking section 403b. Therefore, the movement of locking section 403b is fixed by the stopper 600.

Herein, the stopper 600 includes the stopping protrusion 601 connected to the locking section 403b, and at least one recess 602 for accommodating the stopping protrusion 601 and thus fixing the locking section 403b. Therefore, the stopping protrusion 601 is inserted into the recess 602, thereby-fixing the locking section 403b.

Further, as shown in FIGS. 8 and 9, when the sliding button 403a is slid in the direction away from main body 100, the locking section 403b also moves in that direction and the locking plate 401 is released from the locker unit 403. In this state, when the one-touch button 402 is pressed, the slide cover 200 is slid in that direction again.

As apparent from the above description, the present invention provides a mobile communication device comprising a slide cover, which is slid over a liquid crystal display of a main body, thereby widening a screen of the liquid crystal display and improving its display functions and the utility of the product.

In addition to the embodiments of the present invention that have been described in detail, those skilled in the art will appreciate that various modifications, additions, and substitutions to the specific elements are possible, without departing from the scope and spirit of the invention as disclosed in the accompanying claims.

What is claimed is:

1. A mobile communication device comprising:
    a main body including a display and guide holes formed at both sides of the display;
    a slide cover sliding between a dosed position and an opened position over a front surface of the display in a longitudinal direction of the main body;
    a pop-up module connected to the slide cover and inserted into the guide holes for sliding the slide cover over the front surface of the display;
    a side grip provided at a side surface of the main body so as to fix the closed and opened positions, the side grip including: a locking plate for locking to and unlocking from a locking groove of the pop-up module; a one-touch button installed on an external surface of the side grip, wherein pressing of the one-touch button allows rotation of the locking plate, thus separating the locking plate from the locking groove; and
    a locker unit installed at a designated position of the external surface of the side grip to maintain a locked state of the locking plate; and a coiled compression spring providing a sliding elastic force to slide the slide cover from the closed position to the opened position.

2. The mobile communication device as set forth in claim 1, wherein guide grooves are formed at both sides of the display in the longitudinal direction to guide the slide cover.

3. The mobile communication device as set forth in claim 1, wherein the display serves as a main display when the slide cover is slid away from the main body to expose the entire display, and serves as a sub-display when the slide cover is slid towards the main body to partially expose the display.

4. The mobile communication device as set forth in claim 1, wherein the slide cover is slid away from the main body during use of the mobile communication device, and is slid towards the main body during nonuse of the mobile communication device.

5. The mobile communication device as set forth in claim 1, wherein the pop-up module includes:
    a head section connected to the slide cover; and
    at least one bar installed at an end of the head section and inserted into the corresponding guide holes, the at least one bar receiving the coiled compression spring.

6. The mobile communication device as set forth in claim 5, wherein the head section includes a connection plate for connecting the at least one bar to an other bar.

7. The mobile communication device as set forth in claim 5, wherein a flexible circuit is installed within an other bar, and a locking groove is formed in a lower end of the at least one bar.

8. The mobile communication device as set forth in claim 1, wherein an upper end of the locking plate contacts the one-touch button, and a lower end of the locking plate is provided with a protrusion for inserting into the locking groove.

9. The mobile communication device as set forth in claim 8, wherein the protrusion includes an incline plane serving to guide the locking plate into the locking groove.

10. The mobile communication device as set forth in claim 8, wherein a plate spring is installed on a rear surface of the protrusion of the locking plate, and provides an elastic force to the protrusion so as to rotate the locking plate.

11. The mobile communication device as set forth in claim 1, wherein a hinge unit is installed in a central portion of the locking plate to facilitate rotation of the locking plate.

12. The mobile communication device as set forth in claim 1, wherein the locker unit includes:
    a sliding button protruding from the external surface of the side grip, and slidable by an external force; and
    a locking section installed within the side grip and integral with the sliding button, wherein the locking section moves together with the sliding motion of the sliding button so as to fix or to release the locking plate.

13. The mobile communication device as set forth in claim 12, further comprising:
    a contacting protrusion installed at an upper end of the locking section, for contacting and fixing the locking plate according to the sliding motion of the locking section; and
    a stopper installed at a lower end of the locking section so as to fix the position of the locking section.

14. The mobile communication device as set forth in claim 13, wherein the stopper includes:
    a stopping protrusion connected to the locking section; and
    at least one recess installed in a designated location of an inner wall of the side grip, and serving to accommodate the stopping protrusion so as to fix the position of the locking section.

* * * * *